Patented Jan. 15, 1929.

1,699,234

UNITED STATES PATENT OFFICE.

WILHELM GAUS AND ROBERT GRIESSBACH, OF LUDWIGSHAFEN-ON-THE-RHINE, AND OTTO SCHLIEPHAKE, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PROCESS FOR MAKING MIXED FERTILIZER.

No Drawing. Application filed January 17, 1928, Serial No. 247,452, and in Germany January 21, 1927.

This invention relates to the production of high grade mixed fertilizers, which are free from useless ballast materials such as hydrochloric and sulfuric acid radicals, sodium, calcium and the like.

We have found that a high grade mixed fertilizer without ballast and consisting substantially of a mixture of at least two of the salts potassium nitrate, ammonium nitrate, ammonium phosphate and potassium phosphate, but which mixture must contain both ammonium and potassium, is obtained by decomposing potassium fluosilicate, obtained from potassium chlorid as described below, with aqueous ammonia and treating the resulting solution of potassium fluorid and ammonium fluorid with a solution of calcium nitrate with or without phosphoric acid, or with mono- or di-calcium phosphate which are equivalents for the purpose of the present invention, if desired in conjunction with phosphoric acid, or with several of these agents, and converting the residual solution, after filtering off the resulting calcium fluorid, into a solid fertilizer. The potassium fluosilicate required may be obtained from potassium chlorid either by interaction thereof with calcium fluorid, silicic acid and hydrochloric acid, or by interaction with aluminium fluosilicate obtainable as described below.

The process consists in detail of the following stages:—

The production of potassium fluosilicate from potassium chlorid takes place according to the equation:—

I. $2KCl + 3CaF_2 + Si(OH)_4 + 4HCl = K_2SiF_6 + 3CaCl_2 + 4H_2O.$

The potassium fluosilicate may also be prepared with minerals containing alumina such as bauxite, kaolin, slags and the like by converting these substances into aluminium fluosilicate according to the following equations:—

II$^a$. $3CaF_2 + Si(OH)_4 + 3H_2SO_4 = H_2SiF_6 + 3CaSO_4 + 4H_2O$

II$^b$. $Kaolin + H_2SiF_6 = Al_2(SiF_6)_3 + silicic\ acid\ residue$

II$^c$. $Al_2(SiF_6)_3 + 6KCl = 2AlCl_3 + 3K_2SiF_6.$

The resulting sparingly soluble potassium fluosilicate may be readily separated from the calcium chlorid solution resulting according to Equation I, or from the aluminium chlorid solution resulting according to Equation II$^c$.

The precipitate is washed, and is then decomposed with aqueous ammonia, hydrated silica being deposited and a solution of potassium fluorid and ammonium fluorid obtained, according to the equation:—

III. $K_2SiF_6 + 4NH_3 + 4H_2O = Si(OH)_4 + 2KF + 4NH_4F.$

The hydrated silica is filtered off, and may be used again for converting a fresh batch of potassium chlorid according to Equation I or for the production of fluosilicic acid according to Equation II$^a$.

The potassium-ammonium fluorid solution, which is generally ammoniacal, is then treated with a suitable quantity of a solution obtained by decomposing crude phosphate with nitric acid, the treatment being continued until all the fluorine has been precipitated as calcium fluorid, according to the equations:

IV. $(2KF + 4NH_4F) + [3Ca(NO_3)_2 + 2H_3PO_4] + 4NH_3 = 3CaF_2 + 2KNO_3 + 2(NH_4)_2HPO_4 + 4(NH_4)NO_3$

IV$^a$. $(2KF + 4NH_4F) + [2Ca(NO_3)_2 + Ca(H_2PO_4)_2] + 2NH_3 = 3CaF_2 + 2KNO_3 + 2(NH_4)_2HPO_4 + 2(NH_4)NO_3.$

IV$^b$. $10KF + 20NH_4F + [9Ca(NO_3)_2 + 6H_3PO_4] + 6CaO = 15CaF_2 + 10KNO_3 + 6(NH_4)_2HPO_4 + 8NH_4NO_3 + 6H_2O.$

This calcium fluorid is separated and may also be used again in accordance with Equations I or II$^a$. The solution, which may be wholly or partially neutralized with ammonia, if necessary, and contains practically nothing but potassium and ammonium nitrate or phosphate, is then evaporated to dryness and yields a high-grade mixed fertilizer with excellent manurial properties.

The phosphate solution needed for converting the potassium-ammonium fluorid solutions is prepared, for example, by dissolving raw phosphate in nitric acid, according to the equations:—

V. $Ca_3(PO_4)_2 + 6HNO_3 = 3Ca(NO_3)_2 + 2H_3PO_4.$
V$^a$. $Ca_3(PO_4)_2 + 4HNO_3 = 2Ca(NO_3)_2 + Ca(H_2PO_4)_2.$

The resulting solution of calcium nitrate and phosphoric acid or mono-calcium phosphate is neutralized, if necessary, and is preferably freed from insoluble residues by filtration.

The process according to the present invention is capable of numerous modifications, which enable the potassium-phosphorous-nitrogen ratio, and also the ratio of ammoniacal nitrogen to nitrate nitrogen, to be varied within wide limits.

Thus, for example, in order to modify the phosphorous content, a portion of the nitric acid used for decomposing the raw phosphate may be replaced by sulfuric acid or a portion of the phosphoric acid may be removed beforehand from the decomposed raw phosphate by precipitation with ammonia, milk of lime or tricalcium phosphate, and the like, in the form of di- or tri-calcium phosphate. In the other hand, when a high phosphorous content is desired, the raw phosphate may be replaced wholly or in part by dicalcium phosphate, or this latter may be converted by the potassium-ammonium fluorid solution directly into potassium phosphate and ammonium phosphate, according to the equation:—

V$^b$. $(2KF + 4NH_4F) + 3CaHPO_4 = CaF_2 + K_2HPO_4 + 2(NH_4)_2HPO_4$.

Moreover, the proportion of potassium may be increased by operating so as to form potassium nitrate according to the equation:—

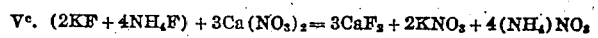

V$^c$. $(2KF + 4NH_4F) + 3Ca(NO_3)_2 = 3CaF_2 + 2KNO_3 + 4(NH_4)NO_3$ the excess of ammonium nitrate being easily removed, wholly or in part, if desired. The operation may, if desired, be conducted so that monoalkali phosphate is formed instead of dialkali phosphate.

The aluminium chlorid solution obtainable according to Equation II$^c$ may be employed for the production of alumina according to the following equation:—

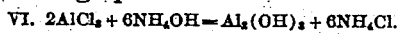

VI. $2AlCl_3 + 6NH_4OH = Al_2(OH)_6 + 6NH_4Cl$.

The process herein described offers, inter alia, the important industrial advantage that all conversions are carried out in aqueous solution and without any great expenditure of energy.

What we claim is:

1. The process for the production of a high grade mixed fertilizer, free from ballast, comprising at least two of the salts potassium nitrate, ammonium nitrate, potassium phosphate, ammonium phosphate, and which must contain both ammonium and potassium, which consists in decomposing potassium fluosilicate obtained from potassium chlorid, with aqueous ammonia into a solution of potassium fluorid and ammonium fluorid and converting this by means of a solution comprising calcium nitrate.

2. The process for the production of a high grade mixed fertilizer free from ballast comprising at least two of the salts potassium nitrate, ammonium nitrate, potassium phosphate, ammonium phosphate, and which must contain both ammonium and potassium, which, consists in decomposing potassium fluosilicate, obtained from potassium chlorid, with aqueous ammonia into a solution of potassium fluorid and ammonium fluorid and converting this by means of a solution comprising calcium nitrate and phosphoric acid.

3. The process for production of a high grade mixed fertilizer free from ballast comprising at least two of the salts potassium nitrate, ammonium nitrate, potassium phosphate, ammonium phosphate, and which must contain both ammonium and potassium, which consists in acting with a mixture of calcium fluorid, silica acid and hydrochloric acid on potassium chlorid, decomposing the resulting potassium fluosilicate with aqueous ammonia into a solution of potassium fluorid and ammonium fluorid and converting this by means of a solution comprising calcium nitrate.

4. The process for the production of a high grade mixed fertilizer free from ballast comprising at least two of the salts potassium nitrate, ammonium nitrate, potassium phosphate, ammonium phosphate, and which must contain both ammonium and potassium, which consists in acting with a mixture of calcium fluorid, silicic acid and hydrochloric acid on potassium chlorid, decomposing the resulting potassium fluosilicate with aqueous ammonia into a solution of potassium fluorid and ammonium fluorid and converting this by means of a solution comprising calcium nitrate and phosphoric acid.

5. The process for the production of a high grade mixed fertilizer free from ballast comprising at least two of the salts potassium nitrate, ammonium nitrate, potassium phosphate, ammonium phosphate, and which must contain both ammonium and potassium, which consists in acting with aluminium fluosilicate, obtainable from kaolin and hydrofluo-silicic acid, on potassium chlorid, decomposing the resulting potassium fluosilicate with aqueous ammonia into a solution of potassium fluorid and ammonium fluorid and converting this by means of a solution comprising calcium nitrate.

6. The process for the production of a high grade mixed fertilizer free from ballast comprising at least two of the salts potassium nitrate, ammonium nitrate, potassium phosphate, ammonium phosphate, and which must contain both ammonium and potassium, which consists in acting with aluminium fluo-silicate, obtainable from koalin and hydrofluo-silicic acid, on potassium chlorid, decomposing the resulting potassium fluosilicate with aqueous ammonia into a solution of potassium fluorid and ammonium fluorid and converting this by means of a solution comprising calcium nitrate and phosphoric acid.

In testimony whereof we have hereunto set our hands.

WILHELM GAUS.
ROBERT GRIESSBACH.
OTTO SCHLIEPHAKE.